United States Patent [19]

Wernecke

[11] Patent Number: 4,479,630

[45] Date of Patent: Oct. 30, 1984

[54] INTERLOCKING MOLD ASSEMBLY

[75] Inventor: Heinz Wernecke, Southfield, Mich.

[73] Assignee: Liberty Die Casting Company, Detroit, Mich.

[21] Appl. No.: 466,254

[22] Filed: Feb. 14, 1983

[51] Int. Cl.³ .......................... B29C 1/00; B29F 1/022
[52] U.S. Cl. ................................... 249/142; 249/160; 425/542
[58] Field of Search ............... 249/142, 124, 161, 173, 249/117, 122, 125, 135, 160; 425/542, 412

[56] References Cited

U.S. PATENT DOCUMENTS

| | | | |
|---|---|---|---|
| 239,357 | 3/1881 | Williamson | 425/412 |
| 2,321,469 | 6/1943 | Draving | 249/160 |
| 2,510,841 | 6/1950 | Stowe | 425/412 |
| 2,834,990 | 5/1958 | Seer | 249/124 |

Primary Examiner—Willard E. Hoag
Attorney, Agent, or Firm—Cullen, Sloman, Cantor, Grauer, Scott & Rutherford

[57] ABSTRACT

A mold assembly for use in injection molding an object having an aperture therein, includes first and second interlocking portions which are separable from each other along an axis which is perpendicular to the axis of the aperture. The aperture is formed by an elongated core which is stationarily defined on one of the mold portions and conformingly engages the other mold portion when the mold is closed. The mold portions are drawn into tight, interlocking engagement with each other by wedge-shaped surfaces adjacent the core and respectively defined on the mold portions, thereby preventing flashing from forming over the aperture during the molding process.

10 Claims, 4 Drawing Figures

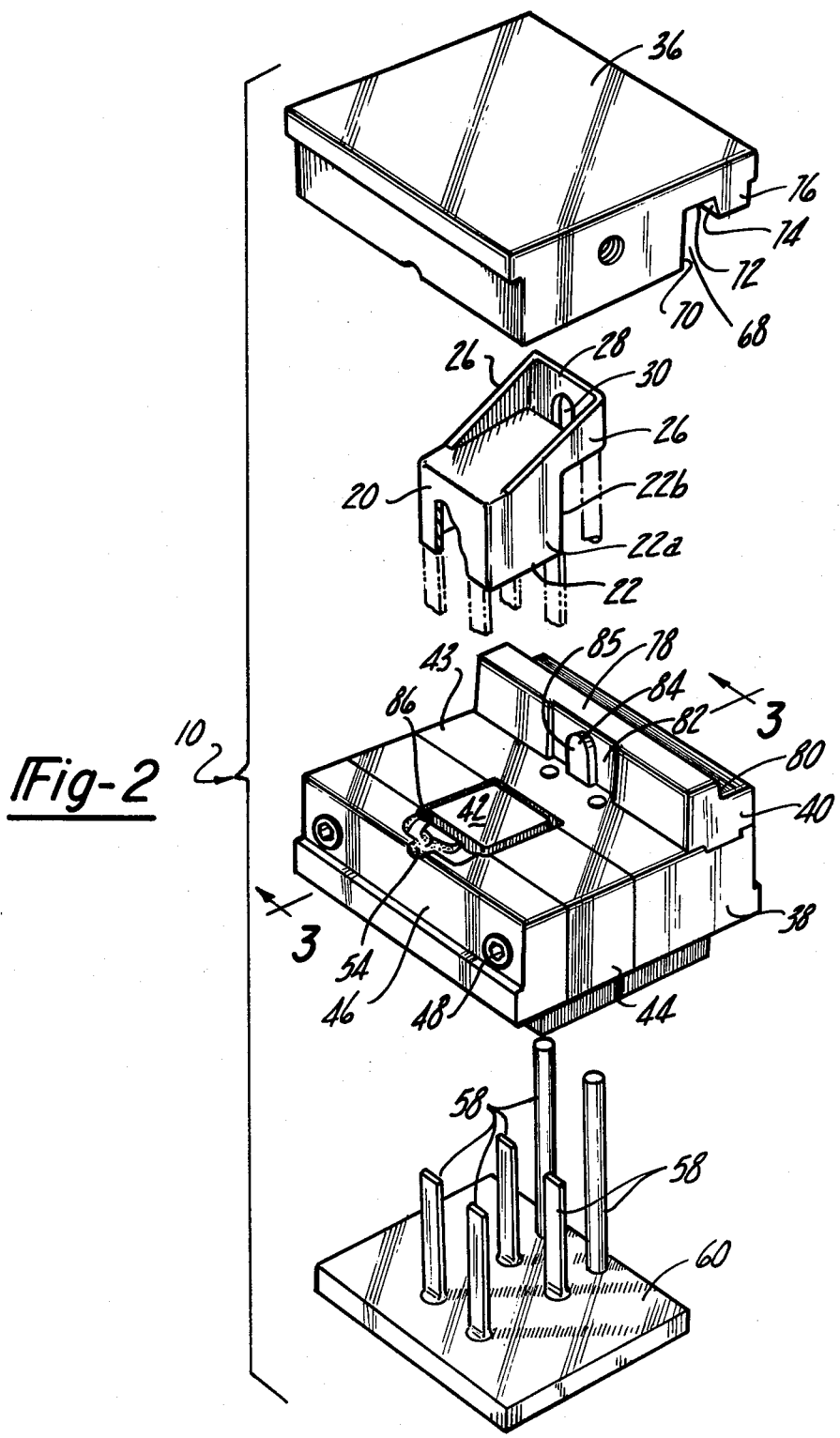

INTERLOCKING MOLD ASSEMBLY

TECHNICAL FIELD

The present invention generally relates to molds, especially those employed in injection molding and deals more particularly with a two part mold for forming an object having an aperture therein whose axis is perpendicular to the line of separation of two parts of the mold.

BACKGROUND ART

Various types of objects are molded which are provided with apertures or bores therein. Typically, these objects are formed using relatively simple, two-piece dies which are mounted in a molding machine, such as an injection molding apparatus, such that the die portions are opened and closed along a straight line. After the molding process is completed, the object is removed from the mold and the necessary bores or apertures are then formed in the object by a subsequent machine operation, as by punching, drilling, etc. This further machine step obviously adds to production costs in terms of labor and is to be avoided if possible.

Others have attempted to devise mold assemblies in which an aperture is molded into the object, however, these prior efforts have involved mold assemblies having three or more separable parts and wherein the fluent molding material is not forced into the mold under high pressure, as in injection molding. The use of mold assemblies having more than two parts is undesirable due to tooling and production costs, moreover, such complicated mold assemblies are incompatible for use in some molding machines such as injection molding apparatus where high productivity is an important goal.

Heretofore, it has not been possible to injection mold an aperture in an object using injection molding techniques, where the axis to the aperture is perpendicular to the line of separation of the die parts. This is a result of the fact that the fluent molding material is forced under high pressure into the mold assembly, and as result of the pressure, the fluent material is forced between portions of the core which is intended to form the aperture; consequently, a thin layer of flashing is formed over the aperture and must therefore be removed in a subsequent machine operation.

There is therefore a clear need in the art for a relatively simple, two-piece mold assembly for forming an object having an aperture therein, wherein the central axis of the aperture extends generally perpendicular to the line of separation of the molds die parts. The present invention meets this need and is therefore responsible for substantially increasing production efficiency and reducing tooling and costs.

BRIEF DESCRIPTION OF THE DRAWINGS

In the drawings, which form an integral part of the specification and are to be read in conjunction therewith, and in which like reference numerals are employed to designate identical components in the various views:

FIG. 2 is a perspective, exploded view of the mold assembly and bracket formed thereby;

BEST MODE FOR CARRYING OUT THE INVENTION

Figure 1:
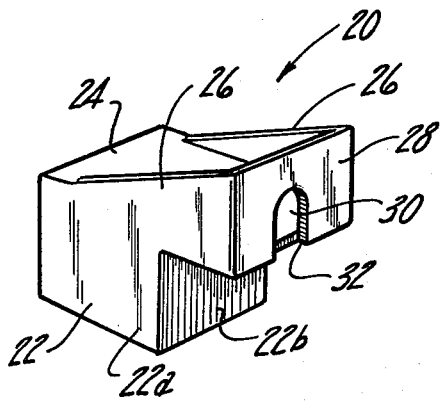
FIG. 1 is a perspective view of a bracket molded by the interlocking mold assembly which forms the preferred embodiment of the invention.

Referring first to FIG. 1, the present invention is broadly concerned with an interlocking molding assembly for molding a part such as bracket 20. Bracket 20 is unitary in construction, preferably of metal and includes a rectangular, essentially hollow portion 22 defined by sidewalls 22a, 22b and a top wall 24. Top wall 24 extends outwardly beyond sidewall 22b and has formed therewith a pair of parallel extensions 26 which are coplanar with the corresponding sidewalls 22a. An end wall 28 extends between the outer ends of extensions 26 and has formed therein a centrally located, elongate slot 30. Slot 30 extends from the center of end wall 28 downwardly to a bottom edge 32 thereof. Extension 26 and end wall 28 form a mounting flange.

Bracket 20 may be employed to mount a bar or the like, one end of such bar (not shown) being received within the hollow rectangular portion 22. A bolt or the like (not shown) extends through the aperture 30 and is secured to a suitable support.

Figure 3:
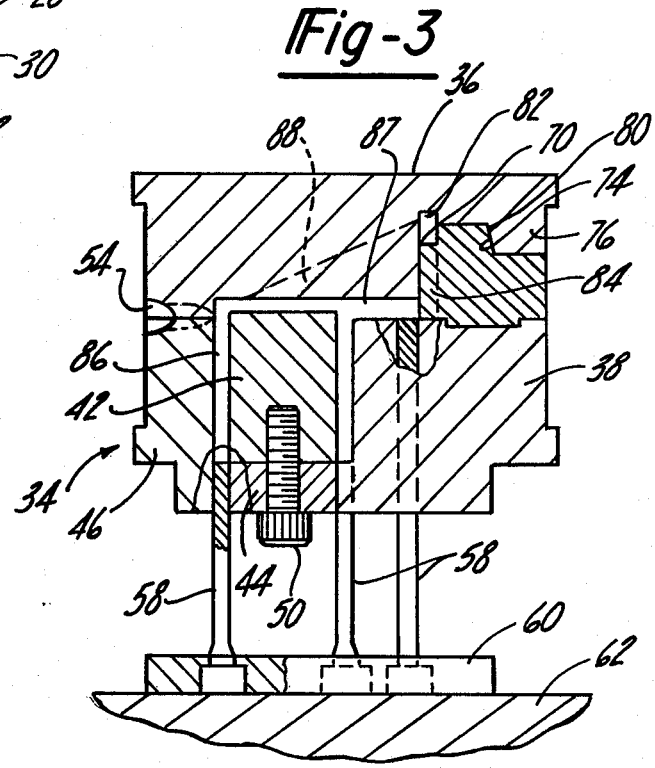
FIG. 3 is a cross-sectional view taken along the line 3—3 in FIG. 2, with the mold assembly in a closed condition; and, FIG. 4 is a perspective, exploded view of the bottom portion of the mold assembly shown in FIGS. 1-3.
Figure 4:
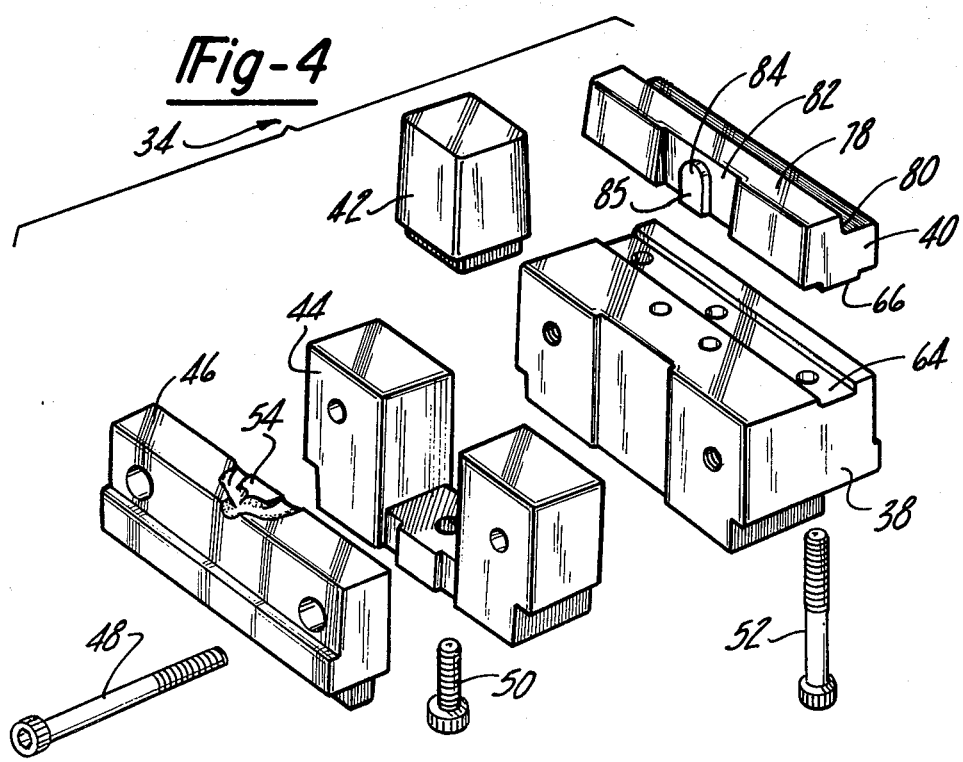

Referring now also to FIGS. 2-4, the mold assembly 10 comprises a first portion or cover die 36 adapted to conjugally mate with a second mold portion or bottom die 34. The first and second mold portions 36 and 34 respectively are in turn secured to suitable portions of a molding apparatus, such as an injection molding machine, wherein at least one of the mold portions is mounted for movement along an axis relative to the other of such die portions.

The cover die 36 is generally rectangular in shape and includes a transversely extending channel 68 therein which is adapted to conjugally receive a correspondingly shaped rib 78 on the bottom die 34. Channel 68 is defined by a molding face 70, a top wall 72 and a lip 74. Lip 74 is slightly inclined relative to the direction of separation of the mold portions 34 and 36, for reasons which will later become apparent.

The bottom die 34 is of multi-piece construction broadly comprising a runner block 46, center block 44, end block 38 and a top bar 40. Blocks 38, 44 and 46 are secured together with bolts 48 and top bar 40 is secured to end block 38 by bolts 52. Blocks 38, 44 and 46 have a rectangularly shaped cutout 86 centrally located therein. A rectangularly shaped molding core 42 is positioned centrally within the cutout 86 and is secured to the center block 44 by means of a bolt 50. Thus, it may be appreciated that the cavity 87 surrounding the molding core 42 when the mold is in its closed position defines the rectangular base portion 22 of the bracket 20.

The top bar 40 includes a rectangularly shaped depression 82 in one side thereof. An elongated slot core 84 is defined centrally within depression 82. As previously indicated, the top bar 40 includes an upper edge 78 adapted to be received within the channel 68 of cover die 36. The upper edge 78 also includes a shoulder 80 which is inclined relative to the axis along which the die portions are separated following the molding process and is adapted to slideably engage lip 74 of cover die 36. Lip 74 and shoulder 80 are preferably inclined relative to the separation axis of approximately 5 degrees. Top bar 40 preferably includes a gib 66 which is received within a way 64 in the top of end block 38 so as to prevent transverse movement of the top bar during the molding process. An inlet channel 54 is defined in opposing portions of the mold assembly 10 to allow introduction of fluent molding material into the internal mold cavity during the molding process.

The bracket 20 is ejected from mold portion 34 by means of an ejector assembly comprising an ejector plate 60 upon which there is mounted a series of ejector rods 58 which extend through corresponding apertures in the mold portion 34 and are adapted to engage portions of the bracket 20.

As best seen in FIG. 3, mold portions 34 and 36 define a mold cavity 87 conforming to the shape of the bracket 20. The mold portions 34, 36 are adapted to be mounted for separation along a plane parallel to the upper face 43 on mold portion 34. It may be further appreciated as seen in FIG. 3 that the core 84 extends transversely into the mold cavity 87 relative to the axis along which the mold portion 34 and 36 are separated following the molding process. The outer face 85 of the core 84 flushly engages face 70 of cover die 36 and therefore forms the aperture 30. Further, since the mold core 84 extends downwardly to the face 43, a clearance space is formed in the flange 28 along the lower edge 32 to allow removal of the bracket 20 without the need for disassembling mold portion 34.

Upon closure of mold portions 34 and 36, the lip 74 and shoulder 80 slideably engage each other, and by virtue of a wedging action therebetween, face 70 is drawn tightly against the outer face 85 of core 84; this action not only assures that the mold assembly interlocks upon closing but also prevents transverse movement of faces 70, 85 relative to each other when fluent molding material is injected under high pressure into the mold cavity 87. This feature prevents the formation of flash over the aperture 30.

From the foregoing, it may be appreciated that the mold assembly described above not only provides for the reliable accomplishment of the objects of the invention but does so in a particularly economical and efficient manner. It is recognized, of course, that those skilled in the art may make various modifications or additions to the preferred embodiment choosen to illustrate the invention with departing from spirit and scope of the present contribution to the art. Accordingly, it is to be understood that the protection sought and to be afforded hereby should be deemed to extend to the subject matter claimed and all equivalents thereof fairly within the scope of the invention.

I claim:

1. Apparatus for molding an object having a body and a flange extending outwardly from said body, said flange including an opening therein through which a bolt or the like may be inserted, comprising:
   first and second mold portions conjugally matable to form a mold for said object,
   said first mold portion including a mold cavity corresponding in shape to said body, said first mold portion including an extension having a depression therein corresponding in shape to the geometry of said flange, said depression including an elongated core therein extending from a position generally central within said depression to one edge of said extension along a reference axis, said first and second mold portions being separable from each other along said reference axis,
   said second mold portion including a molding face covering said depression and flushly abutting said molding core, whereby the opening defined in said flange is slot shaped.

2. The apparatus of claim 1, wherein:
   said extension includes a shoulder spaced from said depression along a reference line extending transverse to said axis, and
   said second mold portion includes a lip for engaging said shoulder,
   said lip and said shoulder cooperating to prevent movement of said molding face away from said molding core under pressure of fluent molding material introduced into said mold.

3. The apparatus of claim 2, wherein said mold core includes a flat face extending parallel to said molding face.

4. The apparatus of claim 2, wherein said shoulder and said lip respectively extend essentially entirely across said first and second mold portions.

5. The apparatus of claim 2, wherein said first mold portion includes an upper, essentially flat face and said extension extends outwardly from said upper face along one edge of said upper face.

6. A mold for forming a bracket including a flange having a face lying within a first plane, said flange having an aperture therein extending transverse to said first plane, comprising:
   first and second mold portions separable from each other by movement along a reference axis parallel to said first plane,
   said first and second mold portions including surface portions in face to face contact with each other and defining a core for forming said aperture in said flange,
   said first and second mold portions including surface areas extending generally transverse to said surface portions and being inclined from said reference axis, said surface areas slideably engaging each other upon closing of said first and second mold portions, sliding engagement of said surface areas loading said surface portions against each other to prevent flashing material from forming between said surface portions upon introduction of fluent molding material under pressure into said mold.

7. The mold of claim 6, wherein:
   said first mold portion includes a shoulder thereon, and
   said second mold portion includes a lip thereon for engaging said shoulder,
   said surface portions being defined on said shoulder and said lip.

8. A mold for injection molding an object having an aperture extending in one direction therethrough, comprising:
   first and second mold portions defining a mold cavity, said first and second mold portions being separable from each other by movement along a reference axis generally perpendicular to said one direction and between an open, separated position in which said object can be removed from said mold and a closed, engaged position in which fluent molding material may be injected under pressure into said mold cavity,
   said first and second mold portions including opposing surface areas extending generally parallel to said reference axis and defining a core for molding said aperture, said first and second mold portions including wedge shaped surfaces engaging each other upon closing of said mold, said wedge surfaces extending generally parallel to said opposing surface areas and forcing said opposing surfaces areas tightly into engagement with each other upon closing said mold whereby to prevent the formation of flashing over said aperture.

9. The mold of claim 8, wherein said wedged shaped surfaces are spaced from said opposing surfaces in said one direction.

10. The mold of claim 8, wherein said wedge shaped surfaces are inclined from said reference axis at approximately five degrees.

* * * * *